(12) United States Patent
Terada et al.

(10) Patent No.: US 7,113,983 B1
(45) Date of Patent: Sep. 26, 2006

(54) SYSTEM AND METHOD FOR DOWNLOADING CONTENT FILES USING A COMMUNICATION NETWORK AND FOR AUTOMATICALLY REPRODUCING THE CONTENT FILES IN A PREDEFINED SEQUENCE

(75) Inventors: Kosei Terada, Hamamatsu (JP); Satoru Umezawa, Hamamatsu (JP); Hiroaki Takahashi, Hamamatsu (JP); Yutaka Hasegawa, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/571,239

(22) Filed: May 18, 2000

(30) Foreign Application Priority Data

May 20, 1999 (JP) .................................. 11-139952
Sep. 22, 1999 (JP) .................................. 11-268971

(51) Int. Cl.
*G06F 15/16* (2006.01)
(52) U.S. Cl. ...................... 709/219; 709/203; 709/213; 709/217; 709/229
(58) Field of Classification Search ........ 709/225–226, 709/229, 331, 203, 205, 209, 213–215, 217–219, 709/247; 707/10, 104.1; 705/26, 51, 57
See application file for complete search history.

(56) References Cited

U.S. PATENT DOCUMENTS

| | | | |
|---|---|---|---|
| 5,416,508 A | | 5/1995 | Sakuma et al. |
| 5,729,741 A | * | 3/1998 | Liaguno et al. .......... 707/104.1 |
| 5,794,217 A | | 8/1998 | Allen |
| 5,918,213 A | * | 6/1999 | Bernard et al. ................ 705/26 |
| 5,953,005 A | * | 9/1999 | Liu .......................... 715/500.1 |

(Continued)

FOREIGN PATENT DOCUMENTS

EP 0 627 690 12/1994

(Continued)

OTHER PUBLICATIONS

Trend in Electronic Commerce Technology: Techniques of Creating and Distributing Digital Contents, Yashuhara Ryuichi, Journal of IPSJ, vol. 38, No. 9, Sep. 1997, pp. 785-791.

(Continued)

*Primary Examiner*—Bharat Barot
(74) *Attorney, Agent, or Firm*—Morrison & Foerster LLP

(57) ABSTRACT

Client is connected to a selected program serving site via a communication network. The program serving site includes a database storing plural types of contents having various different characters and can supply a program file defining a reproducing sequence of a plurality of contents including those of different characters. The client includes a plurality of types of reproduction engines which are capable of reproducing the contents of the respective characters. The client receives a program file from the program serving site and also receives, from the database of the site, contents specified by the received program file. For reproduction of a desired program file, the client reproduces the individual contents in a reproducing sequence defined by the program file, using any one of the reproduction engines which corresponds to the type of each content to be reproduced. The program progression can be fast-forwarded or fast-reversed by fast-forwarding or fast-rewinding a currently-reproduced content. Contents meeting a search condition specified by the client are searched for and retrieved from the program serving site, and a new program file including the retrieved contents is created. The client can edit the program file, display information pertaining to the currently-reproduced content and select and purchase any desired content.

64 Claims, 8 Drawing Sheets

U.S. PATENT DOCUMENTS

| | | | |
|---|---|---|---|
| 5,963,916 A * | 10/1999 | Kaplan | 705/26 |
| 6,018,765 A | 1/2000 | Durana et al. | |
| 6,256,554 B1 | 7/2001 | DiLorenzo | |
| 6,385,596 B1 * | 5/2002 | Wiser et al. | 705/51 |
| 6,493,748 B1 | 12/2002 | Nakayama et al. | |
| 6,515,212 B1 * | 2/2003 | Taira et al. | 709/247 |
| 6,594,700 B1 * | 7/2003 | Graham et al. | 709/230 |
| 6,691,149 B1 * | 2/2004 | Yokota et al. | 709/203 |
| 6,807,641 B1 * | 10/2004 | Ishiguro et al. | 714/6 |
| 6,904,454 B1 * | 6/2005 | Stickler | 709/213 |

FOREIGN PATENT DOCUMENTS

| | | |
|---|---|---|
| EP | 0823 815 A2 | 2/1998 |
| EP | 0 864 990 A2 | 9/1998 |
| EP | 0 971 296 A2 | 1/2000 |
| EP | 0971496 | 1/2000 |
| GB | 0011955.2 | 1/2001 |
| JP | 5-115063 | 5/1993 |
| JP | 8032538 | 2/1996 |
| JP | 09-298697 | 11/1996 |
| JP | 10124586 | 5/1998 |
| JP | 10-155140 A | 6/1998 |
| JP | 10262227 | 9/1998 |
| JP | 10-285460 A | 10/1998 |
| JP | 11-39242 | 2/1999 |
| JP | 11-088279 A | 3/1999 |
| JP | HEI 11-88419 | 3/1999 |
| JP | 11-096180 | 4/1999 |
| JP | 11-249951 A | 9/1999 |
| WO | WO 96/26493 | 8/1996 |
| WO | WO-97/22201 | 6/1997 |
| WO | WO-98/37695 | 8/1998 |
| WO | WO-98/47290 | 10/1998 |
| WO | WO-98/56188 | 12/1998 |
| WO | WO-99/25082 | 5/1999 |
| WO | WO 01/09864 A1 | 2/2001 |

OTHER PUBLICATIONS

Trend in Multimedia Information Distribution Technology, Nakamura Yuzo, NTI Software Laboratories, 1995, pp. 865-872.

Domestic "Information Control Tower" will hit the market. Asynchronous image reproduction will come into practical use, Nikkei Electronics, No. 700, Part 3: Home server, pp. 127-140, 1997.

Fundamental Techniques of Video Server and Set-top for VOD, The Journal of the Institute of Television Engineers of Japan, Konishi Tomoo, vol. 49, No. 5, pp. 605-610, 1995.

Hong Kong Telecom IMS The Worlds finest commerical VOD appeared in Hong Kong Interactive TV will serve 300 thousand homes, Nikkei Multimedia for Business, No. 33, Apr. 1998, pp. 82-87.

Real System G2, p. 980105, vol. 12 of Nikkei Internet Technology issued Jun. 22, 1998 by Nikkei BP Sha.

Establish a Footing of XML, pp. 139-145, vol. 94 of Software Design issued Aug. 18, 1998 by Kabushiki Kaisha Gijutsuhyoronsha.

Real System G2, Significant Enhancement of Presentation Functions from Video Distribution to Intra, pp. 78-83, vol. 38 of Nikkei Malti-Media issued Aug. 15, 1998 by Nikkei BO Sha.

"Real System G2: Significant Enhancement of Presentation Functions from Video Distribution to Intra", Isao Yasui, pp. 78-83, vol. 38 of Nikkei Malti-Media, Japan, issued Aug. 15, 1998 by Nikkei BP Sha.

"First One Loaded With SMIL/RTSP, a Standard Technique For Applying The Convenience of Web to Streamdata", Phillip Keys, Toru Teshima, pp. 98-205, vol. 12 of Nikkei Internet Technology, Japan, issued Jun. 22, 1998 by Nikkei BP Sha.

Real System G2, pp. 98-105, vol. 12 of Nikkei Internet Technology issued Jun. 22, 1998 by Nikkei BP Sha.

* cited by examiner

<PROGRAM LIST FILE>

| PROGRAM NAME | URL OF PROGRAM FILE |
|---|---|
| PROGRAM NAME | URL OF PROGRAM FILE |
| : | : |

FIG. 2

<PROGRAM FILE>

| PROGRAM NAME | | | REPRO. SEQUENCE |
|---|---|---|---|
| CONTENT URL | CONTENT ID | BASIC CONTENT INFO. | OPENING MC (AUDIO) |
| CONTENT URL | CONTENT ID | BASIC CONTENT INFO. | MUSIC PIECE (MIDI) |
| CONTENT URL | CONTENT ID | BASIC CONTENT INFO. | MC (AUDIO) |
| CONTENT URL | CONTENT ID | BASIC CONTENT INFO. | MUSIC PIECE (AUDIO) |
| CONTENT URL | CONTENT ID | BASIC CONTENT INFO. | MUSIC PIECE (MOVING PICTURE) |
| CONTENT URL | CONTENT ID | BASIC CONTENT INFO. | ENDING MC (AUDIO) |

FIG. 3

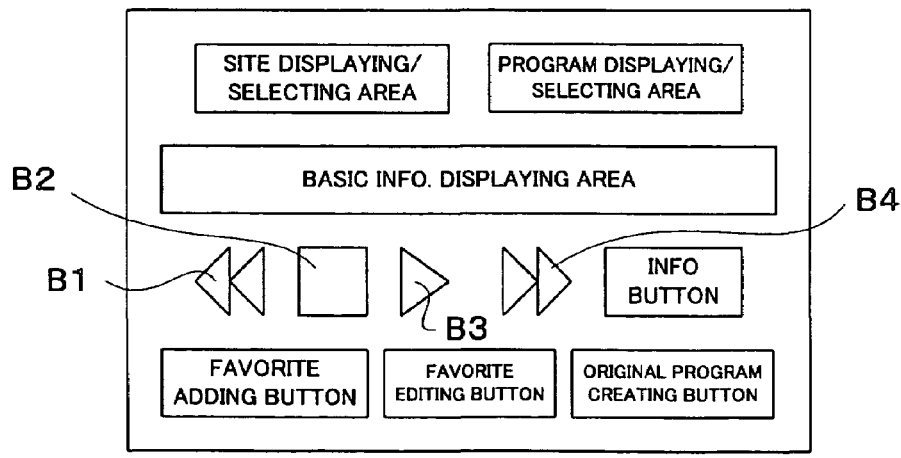

FIG. 4

SYSTEM AND METHOD FOR DOWNLOADING CONTENT FILES USING A COMMUNICATION NETWORK AND FOR AUTOMATICALLY REPRODUCING THE CONTENT FILES IN A PREDEFINED SEQUENCE

BACKGROUND OF THE INVENTION

The present invention relates generally to program reproduction systems and methods for reproducing broadcast programs or other types of programs, each comprised of a set of music and/or picture information, downloaded or distributed via a communication network, and more particularly to an improved program reproduction system and method that are for example capable of reproducing programs comprising a mixture of various contents of different characters.

Typical examples of the conventionally-known systems for distributing broadcast or other types of programs, comprised of music or video data, include radio and television broadcasting systems. However, because radio and television programs are sent unidirectionally from broadcasting stations, interested users or audiences (listeners or viewers) are unable to listen to or view their desired programs at their desired time. Thus, "Internet" broadcasting stations have recently come on the scene as a new form of program distributing facility that is different from the existing radio and television broadcasting stations. The Internet broadcasting stations each distribute any of programs stored somewhere on a communication network, at an interested user's request; that is, on the basis of an interested user's request entered via a terminal (client) such as a personal computer (PC), the client station is connected to a World Wide Web (WWW) server by way of a communication network, such as the Internet, so that the client station is supplied with a program of music piece or video (picture) data stored previously in the WWW server and then reproduces the program on the basis of the received data. Normally, for data distribution using a communication network, each WWW server distributes the data in streams to a client station in such a manner that reproduction of a requested music piece, picture or the like can be initiated before reception of all the necessary data has been completed by the client station. With such an Internet broadcasting station, audiences are allowed to listen to or view any desired programs at any desired convenient time.

Program contents to be distributed via a communication network can be diversified by making programs of a wide variety of contents. For that purpose, the programs have to be made to contain a plurality of contents having different characters (e.g., different data formats) in a mixed fashion. However, with the above-mentioned Internet broadcasting stations, all the contents in each one of the programs are arranged to have a same character (same data format). Namely, the Internet broadcasting stations today can not provide programs of diversified contents due to the fact that the conventionally-known program reproduction systems used in connection with the Internet broadcasting stations and the like are unable to reproduce programs containing a plurality of types of contents having different characters in a mixed fashion (e.g., programs which comprise a mixture of plural types of contents prepared in different data formats, such as contents of MIDI music performance information, audio sounds and pictures).

Further, with the conventionally-known program reproduction systems, interested users can not freely enjoy a distributed program by fast-forwarding/fast-rewinding a desired content within the program. Further, interested users can not purchase a desired content of the distributed program. In addition, interested users can not create their own original program by optionally combining a plurality of contents of the distributed program. Besides, interested users are unable to view information pertaining to and descriptive of sequentially reproduced contents (i.e., content-related information) separately on a content-by-content basis.

SUMMARY OF THE INVENTION

It is therefore an object of the present invention to provide a program reproduction system and method which are capable of appropriately reproducing a program that comprises various types of contents of different characters in a mixed fashion.

It is another object of the present invention to provide a program reproduction system and method which allow a user to fast-forward or fast-rewind a desired content within a program even during reproduction of the program.

It is still another object of the present invention to provide a program reproduction system and method which allow an interested user to purchase any desired content reproduced thereby.

It is still another object of the present invention to provide a program reproduction system and method which allow a user to create an original program.

It is still another object of the present invention to provide a program reproduction system and method which allow a user to view various information pertaining to and descriptive of contents sequentially reproduced within a program.

To accomplish the above-mentioned objects, there is provided, according a first aspect of the present invention, a program reproduction system for transmitting and reproducing contents via a communication network, which comprises: a program serving site having a memory storing a plurality of types of contents having different characters and adapted to supply a program file defining a reproducing sequence of a plurality of contents including contents of different characters; and a client connectable to the program serving site via the communication network and having a plurality of types of reproduction engines capable of reproducing the plurality of types of contents having different characters. The client in the inventive system is adapted to: receive a program file from the program serving site; receive, from the program serving site, contents specified by the received program file; and reproduce each of the received contents in a reproducing sequence defined by a program file to be reproduced, using any one of the reproduction engines which corresponds to the type of the content to be reproduced.

According to the primary aspect of the present invention, the program file only includes information that defines a reproducing sequence of a plurality of contents constituting a program such as an Internet-broadcast program or other type of network-distributed program; that is, the program file itself does not include such contents. The individual contents specified by this program file are retrieved one by one from the memory (i.e., content database) of the program serving site, in response to a request given from the client. Thus, even for a given program comprising a plurality of contents that differ in their type, i.e., data format, a program file corresponding to the given program can be readily made by merely combining these contexts. The client or client station, on the other hand, includes a plurality of types of reproduction engines provided in corresponding relation to and capable of reproducing the plurality of types of contents having different characters. Thus, the client station can reproduce each of the contents, selectably using any one of the reproduction engines which corresponds to the type of the content to be reproduced. Consequently, even where various types of contents having different characters are mixedly included in a program file, these contents in the program file can be reproduced appropriately by the client using the different reproduction engines as appropriate. Therefore, according to the first aspect of the present invention, it is possible to readily create and then appropriately reproduce a program comprising a mixture of various types of contents having different characters, such as contents of music performance information in the form of MIDI data, contents of talk or other sound information in the form of audio data, and contents of picture information in the form of video data. As a result, the present invention provides for creation and reproduction of programs having greatly diversified contents.

In one preferred implementation of the present invention, the program serving site is capable of supplying a plurality of program files, and the client is adapted to selectively designate a desired one of the plurality of program files and receive the designated desired program file from the program serving site. Further, the client may be adapted to selectively designate a desired one of the plurality of program files and make a program list containing the designated desired program file. Thus, an interested user is allowed to readily select any desired program.

According to a second aspect of the present invention, there is provided a program reproduction system for transmitting and reproducing contents via a communication network, which comprises: a program serving site including a memory storing a plurality of contents and adapted to supply a program file defining a reproducing sequence of a plurality of contents; and a client connectable to the program serving site via the communication network and including a reproduction engine for reproducing contents and an operator adapted to give at least one of fast-forwarding and fast-rewinding instructions. The client is adapted to: receive a program file from the program serving site; receive, from the program serving site, contents specified by the received program file; reproduce each of the received contents in a reproducing sequence defined by a program file to be reproduced, using the reproduction engine; and fast-forward or fast-rewind a currently-reproduced content in the program file to be reproduced, in accordance with the fast-forwarding or fast-rewinding instruction given via the operator.

According to the second aspect of the present invention, the client or client station is allowed to not only reproduce a program made up of a plurality of contents but also fast-forward or fast-rewind (fast-reverse) the progression of the program by fast-forwarding or fast-rewinding a content being currently reproduced. As noted earlier, the program serving site stores therein a program file corresponding to a program to be distributed, as well as contents constituting the program with each content as a separate data group. In the reproducing sequence or order defined by the program file, the client receives or acquires the contents from the program serving site and reproduces the received contents. For example, when an instruction to fast-forward or fast-rewind a specific content of a currently-reproduced program is given, the client acquires another content that precedes or follows the specific content in the reproducing sequence defined by the program file, in response to the instruction. This way, the client can reproduce the program while fast-forwarding or fast-rewinding a selected content or contents.

According to a third aspect of the present invention, there is provided a program reproduction system for transmitting and reproducing contents via a communication network, which comprises: a program serving site including a memory storing a plurality of contents, and adapted to make a search through the memory to retrieve therefrom one or more contents satisfying a given search condition and make a program file defining a reproducing sequence of a plurality of contents containing the retrieved contents; and a client connectable to the program serving site via the communication network and including a reproduction engine for reproducing contents. The client is adapted to: specify a desired search condition to the program serving site; receive a program file from the program serving site; receive, from the program serving site, contents specified by the received program file; and reproduce each of the received contents in a reproducing sequence defined by a program file to be reproduced, using the reproduction engine.

According to the third aspect of the present invention, the client is allowed to independently and readily create an original program of contents matching a predetermined condition and appropriately reproduce the thus-created program. For that purpose, the program serving site searches the memory (content database) for one or more contents matching the search condition specified by the client. Once such contents matching the specified search condition have been retrieved from the memory of the program serving site, a new program file is created such as by sequentially registering the contents into the program file. The new program file may be made up solely of the retrieved contents or be made by replacing part of the existing contents with the retrieved contents. In this way, the client is allowed to freely create a program in an independent fashion that has not been provided previously in the program serving site and also appropriately reproduce the thus-created original program.

In one preferred implementation, the client includes an operator and a processor coupled with the operator, and the processor is adapted to, in response to an operation of the operator, edit the reproducing sequence of the contents in the program file received from the program serving site. The editing may be made such as by changing the reproducing sequence of the contents in the received program file or deleting any of the contents. With this arrangement, the user, i.e., listener or viewer, is allowed to readily change the reproducing sequence of the contents in the received program file or delete any of the contents as desired.

According to a fourth aspect of the present invention, there is provided a program reproduction system for transmitting and reproducing contents via a communication network, which comprises: a program serving site including a memory storing a plurality of contents and adapted to supply a program file defining a reproducing sequence of a plurality of contents and content-related information for individual ones of the contents; and a client connectable to the program serving site via the communication network and including a reproduction engine for reproducing contents and a display section. The client is adapted to: receive a program file from the program serving site; receive, from the program serving site, contents specified by the received program file; reproduce each of the received contents in a reproducing sequence defined by a program file to be reproduced, using the reproduction engine; and receive, from the program serving site, the content-related information for each received content or each content which is being currently reproduced and display the received content-related information on the display section.

In one preferred implementation of the present invention, the program file contains identification information identifying the individual contents, and the client receives the content-related information from the program serving site on the basis of the identification information of the currently reproduced content.

According to a fifth aspect of the present invention, there is provided a program reproduction system for transmitting and reproducing contents via a communication network, which comprises: a program serving site including a memory storing a plurality of contents and adapted to supply a program file defining a reproducing sequence of a plurality of contents, the program file containing content-related information for individual ones of the contents; and a client connectable to the program serving site via the communication network and including a reproduction engine for reproducing contents and a display section. The client is adapted to: receive a program file from the program serving site; receive, from the program serving site, contents specified by the received program file; reproduce each of the received contents in a reproducing sequence defined by a program file to be reproduced, using the reproduction engine; and retrieve, from the program serving site, the content-related information for each received content or each content which is being currently reproduced and visually display the retrieved content-related information on the display section.

According to the fourth and fifth aspects of the present invention, various information pertaining to contents to be sequentially reproduced (content-related information) can be visually presented on the display section. The content-related information for the individual contents prestored in the memory (content database) may be stored in a suitable memory or incorporated in a program file on the side of the program serving site. When the client receives given contents from the program serving site or is in the process of reproducing a specific content, the content-related information for each received content or each currently reproduced content is visually displayed on the display section. In the case where such content-related information is stored in the memory of the program serving site, the client acquires the content-related information from the memory of the program serving site. In the case where such content-related information is incorporated in the program file received by the client, on the other hand, the content-related information is read out from the received program file and displayed on the display section. In this way, the client can reproduce the program while displaying the content-related information descriptive of the program.

According to a sixth aspect of the present invention, there is provided a program reproduction system for transmitting and reproducing contents via a communication network, which comprises: a program serving site including a memory storing a plurality of contents, and adapted to supply a program file defining a reproducing sequence of a plurality of contents and perform a content selling process upon receipt of a content purchase request; and a client connectable to the program serving site via the communication network and including a reproduction engine for reproducing contents and an operator. The client being adapted to: receive a program file from the program serving site; receive, from the program serving site, contents specified by the received program file; reproduce each of the received contents in a reproducing sequence defined by a program file to be reproduced, using the reproduction engine; and generate a content purchase request in response to an operation of the operator and transmit the content purchase request to the program serving site.

According to the sixth aspect of the invention, any interested user of the client station is allowed to purchase any desired content of a program which he or she is listening to or viewing. For this purpose, the user manipulates the operator to issue, to the program serving site, a content purchase request asking for the desired content. Upon receipt of such a content purchase request from the client, the program serving site carries out a predetermined process to sell the requested content to the client. Because, in the present invention, the individual contents are prestored in the memory (content database) of the program serving site separately from the program file and separately from each other—instead of each program made up of a plurality of contents being prestored in its entirety as a single set of data—, the client can acquire each individual content separately from the program serving site. As a result, the client allows the user to selectively purchase only a desired one of the contents of the program.

In one preferred implementation of the present invention, the client generates a content purchase request asking for one of the contents which is being currently reproduced and transmits the content purchase request to the program serving site. In response to the content purchase request from the client, the program serving site performs the selling process to sell the client a regular (i.e., non-sample) content corresponding to the content being currently reproduced by the client.

In one preferred embodiment of the present invention, the program serving site supplies the client with a predetermined sample content in response to a content purchase request from the client asking for any one of the contents specified by the program file. Then, for each of the contents having been finally determined to be sold via the selling process, the program serving site supplies the client with a non-sample regular content.

In one preferred implementation of the present invention, the program file contains storage location information that is indicative of a storage location of each of the contents in the program serving site, and the client receives a desired one of the contents from the program serving site on the basis of such storage location information.

According to still another aspect of the present invention, there is provided a machine-readable storage medium containing a data group of a program file. The program file is used when contents are to be transmitted from a program serving site via a communication network to a client for reproduction by the client. The program file defines a reproducing sequence of a plurality of contents and includes content information defining or describing individual ones of the plurality of contents. The content information for each of the contents includes: storage location information that is indicative of a storage location of the content in the program serving site; identification information identifying the content; and displaying information pertaining to the content. The storage location information is usable to retrieve the content from the program serving site and the displaying information is usable to make a visual display pertaining to the content.

The present invention may be constructed and implemented not only as the system or apparatus invention as set out above but also as a method invention. The present invention may also be embodied as a program for execution by a processor such as a computer or DSP, and as a storage medium storing such a program. Further, the present invention may be implemented as a storage medium storing program files of a novel construction.

BRIEF DESCRIPTION OF THE DRAWINGS

For better understanding of the object and other features of the present invention, its preferred embodiments will be described in greater detail hereinbelow with reference to the accompanying drawings, in which:

FIG. 2 is a conceptual diagram explanatory of an example of a program list file employed in the program reproduction system of FIG. 1;

FIG. 3 is a conceptual diagram explanatory of an example of a program file employed in the program reproduction system of FIG. 1;

FIG. 4 is a block diagram conceptually showing an example of an operation panel;

DETAILED DESCRIPTION OF THE PREFERRED EMBODIMENTS

Figure 1:
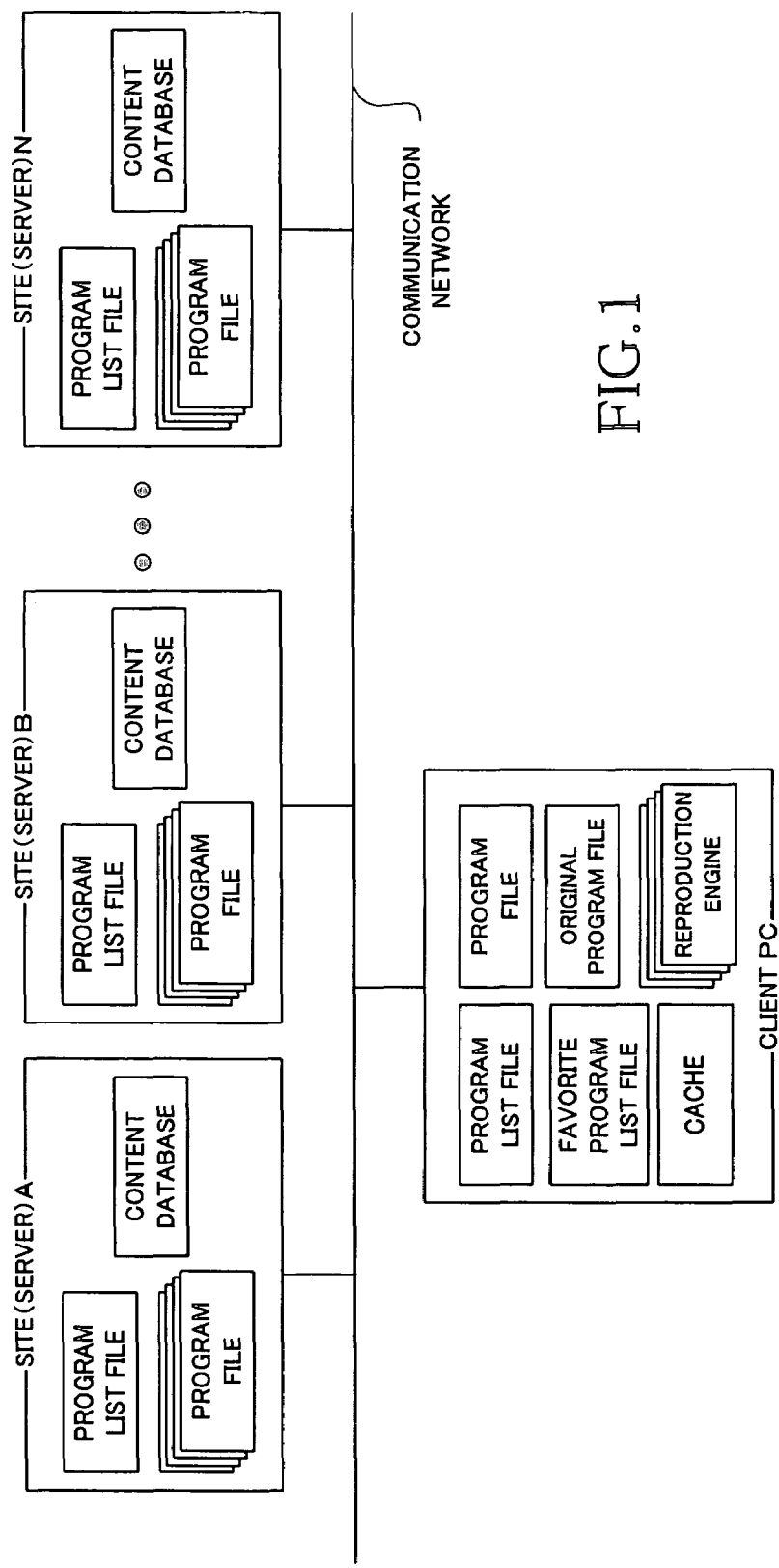
FIG. 1 is a block diagram showing a general hardware setup of a program reproduction system in accordance with a preferred embodiment of the present invention.

FIG. 1 is a block diagram showing a general hardware setup of a program reproduction system in accordance with a preferred embodiment of the present invention. The program reproduction system of FIG. 1 includes a plurality of sites (i.e., program serving sites or servers) A–N, a client (i.e., client station) PC and a communication network X connecting the program serving sites (servers) A–N and client station PC. Each of the sites (servers) A–N and client station PC comprises a computer including a CPU, ROM, RAM, hard disk, modem, etc. (all not shown) and can independently transmit and receive data (e.g., contents of an Internet-broadcast or other type of distributed program) via the communication network X. Namely, the client station PC is connectable any desired one of various communication networks X, such as a LAN (Local Area Network), Internet and telephone line network, for transmission/reception of various data to/from any one of the program serving sites or servers A–N. Although the program reproduction system of the present invention may include other hardware than the above-mentioned, it will be described hereinafter only in relation to a case where minimum necessary resources are employed. Note that the communication network X may be of the wireless type rather than the wire-connected type. Further, a plurality of clients (i.e., client stations) PC may be connected to the communication network X.

In the preferred embodiment, each of the independent sites A–N may be constructed substantially similarly to a radio or television broadcasting station, and a great number of program files are prestored in a program storage section or area of each of the sites A–N. Each of the program files, which corresponds generally to a radio, television program, comprises a time-serial combination of various contents such as MIDI files in the form of music piece data, audio files in the form of data relating to sounds or voices of the music piece or master of ceremonies (MC) and moving or still picture files in the form of video data, as will be later described in detail. The program contents, such as the MIDI, audio, moving picture and still picture files (content files), are prestored in content databases (storage sections) of the individual program serving sites A–N, along with a multiplicity of other contents to be used for other purposes than the program distribution. All the program files stored in the individual program serving sites A –N can be identified by means of a program list file.

The client station PC can select any one of the program serving sites A–N and then select any one of the program files for reproduction. More specifically, the client station PC first receives (obtains or acquires) a program list from the selected site A–N to store it in memory as a program list file. Then, the client station PC selects any one of the programs on the program list and obtains a corresponding program file from the selected site A–N to store it in memory. After that, the client station PC selects and obtains program contents (files) from the selected site A–N and reproduces the obtained program contents by means of a reproduction engine. The embodiment can use two reproduction modes, i.e., an "on-line reproduction mode" and an "off-line reproduction mode". In the "on-line reproduction mode", desired program contents are obtained from the selected site A–N and reproduced on a real-time basis. In the "off-line reproduction mode", program contents designated by the program file are obtained collectively and then reproduced after being temporarily stored in a cache memory. Further, as will be later described in detail, an interested user can register his or her favorite program in a favorite program file and also create his or her own original program. These pieces of information are stored into the client station PC as a favorite program list file and original program file. Note that the client station PC includes storage sections or storage areas provided in corresponding relation to the above-mentioned files.

Now, a brief description will be given about specific examples of the program list file and program file, with reference to FIGS. 2 and 3. Specifically, FIG. 2 is a conceptual diagram explanatory of an example of the program list file, while FIG. 3 is a conceptual diagram explanatory of an example of the program file.

The program list file is a collection of data indicating a list of programs prestored in the individual program serving sites A–N and includes program names and URLs (Uniform Resource Locators) of program files, as shown in FIG. 2. Each of the program names represents a unique name or title assigned to one particular program, and each of the URLs of the program files represents a location in the site where one particular program file is stored and is uniquely assigned to the program file. For instance, each of the URLs is an address (e.g., Internet address) assigned to a particular program file stored in one of the sites on the communication network X so that access to the particular program file can be made from the client station PC and another one of the sites A–N.

In each of the program files, there is stored content information, such as MIDI, audio, moving picture and still picture files, in a predetermined sequence of the program progression or reproduction. For instance, in the case of a given program made up of an opening MC (audio file), first music piece (MIDI file), MC (audio file), second music piece (MIDI file), third music piece (moving picture file) and ending MC (audio file), respective content information is stored in the program file in the mentioned order of the files, as illustratively shown in FIG. 3. The program file is a collection of data indicating all the content information contained in one particular program, which includes content information consisting of a set of a "program name", "content URLs", "content IDs" and "basic content information". The program name is a unique name or title of one particular program similarly to the program name in the program list file. Each of the content URLs is information designating a location in which one particular program file is stored, each of the content IDs is information identifying one particular content, and each of the basic content information is descriptive of basic details of one particular program (such as a lyric writer, composer, player, etc. if the content concerns a music piece, or descriptive of a master of ceremonies if the program concerns an MC's speech. Further, the favorite program list file is constructed in a similar manner to the above-mentioned program list file, and the original program file is constructed in a similar manner to the above-mentioned program file.

Note that in the case where a music piece is stored as a moving picture file as with the third music piece in the program file of FIG. 3, video data of moving and/or still pictures, rather than the music piece data alone, are recorded (e.g., a promotion video).

The following paragraphs describe an operation panel that is used in the inventive program reproduction system and can be operated by a user to reproduce a desired program. FIG. 4 is a block diagram conceptually showing an example of the operation panel, which is provided on the client station PC so that a user can perform various operations such as ones for reproducing a desired program.

In a "site displaying/selecting area" of the operation panel of FIG. 4, a list of the program serving sites A –N is displayed so that the user can select any desired one of the displayed sites A–N. In a "program displaying/selecting area" of the operation panel, program names specified by a program list file stored in the selected site are displayed so that the interested user can select any desired one of the displayed programs. In a "basic information displaying area" of the operation panel, various basic information is displayed which pertains to a program content being currently reproduced (i.e., basic content information of a program file). Double-triangle button B1 pointing leftward is an REW button for fast-rewinding or fast-reversing a currently reproduced content, and a double-triangle button B4 pointing rightward is an FF button for fast-forwarding a currently reproduced content. Single-triangle button B3 pointing rightward is a playback button for reproducing a content, and a square button B2 is a stop button for stopping reproduction of a content being reproduced. INFO button is a button for displaying later-described information. Favorite adding button is a button for adding a currently reproduced program to the favorite program list file, and a favorite editing button is a button for displaying a favorite list editing screen (not shown) to allow the user to edit the favorite program list file. Original program editing button is a button for displaying an original program creating screen (not shown) to create/edit the original program file.

Although not specifically shown in FIG. 4, the operation panel also includes a picture display area for displaying moving and still pictures.

Figures 5, 8:
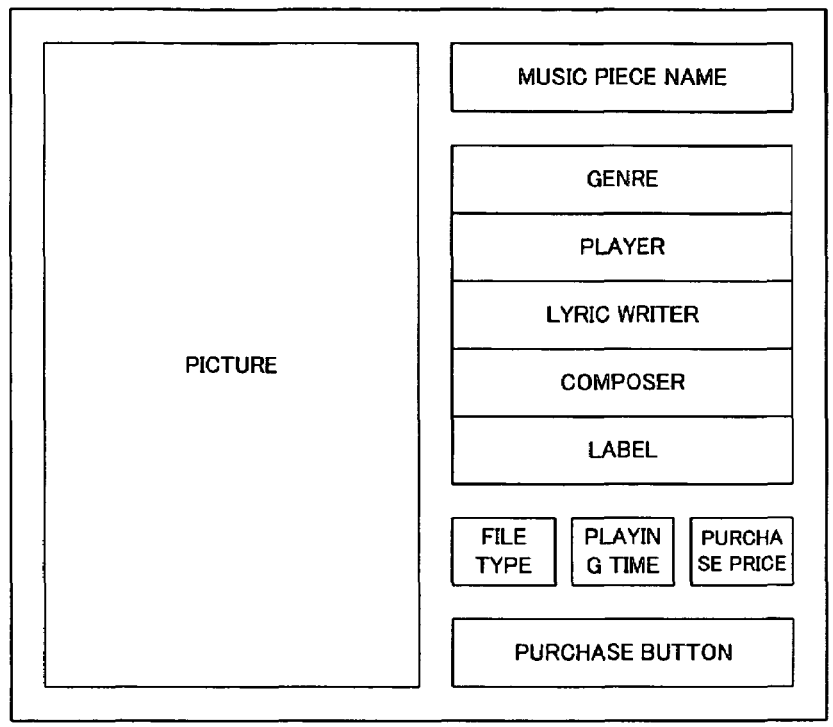
FIG. 5 is a conceptual diagram showing an example of an information display made in the program reproduction system.
FIG. 8 is a conceptual diagram showing an example of a program file which is arranged to allow a plurality of contents to be reproduced concurrently in a parallel fashion.

In response to a user operation or activation of the INFO button, various information is displayed in a manner as shown in FIG. 5. In the described embodiment, information pertaining to a picture is displayed in the left half of the screen and information pertaining to program contents is displayed in the right half of the screen. The information pertaining to program contents includes music-piece-related information such as MIDI and audio files. More specifically, the name or title, genre, player, lyric writer, composer, label, file type, playing time, etc. of the music piece are displayed in response to the activation of the INFO button. Also displayed is a price at which the music piece (contents) can be purchased. Each program content can be purchased on line by any interested user or audience by activating a "purchase button". Techniques relating to the online content purchase are well known and thus are not described here.

Figure 6A:
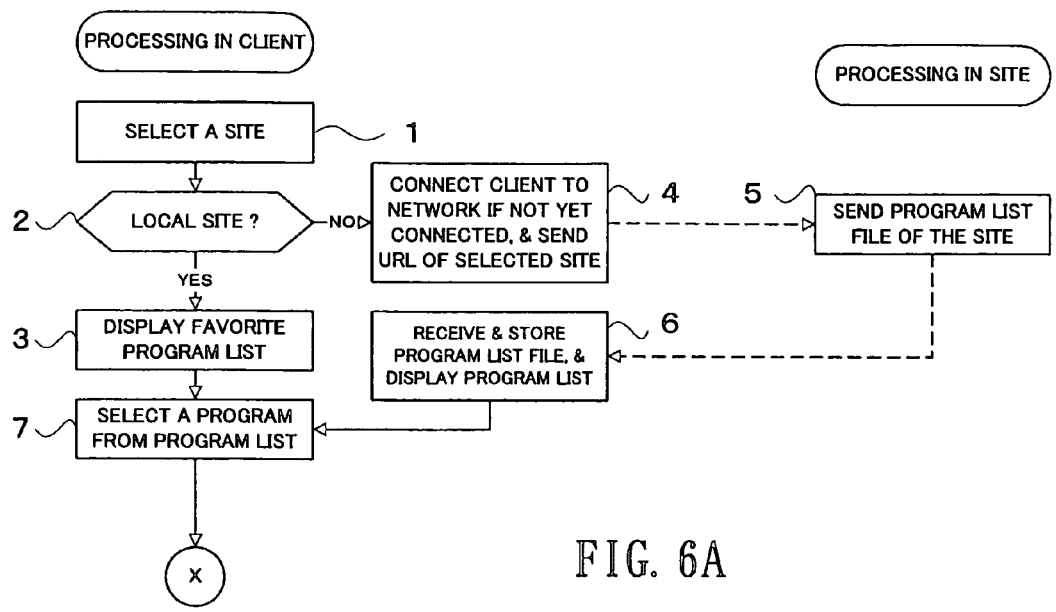
FIGS. 6A to 6C are flow charts showing an example of program reproduction processing that is performed in the program reproduction system of the present invention.
Figure 6B:
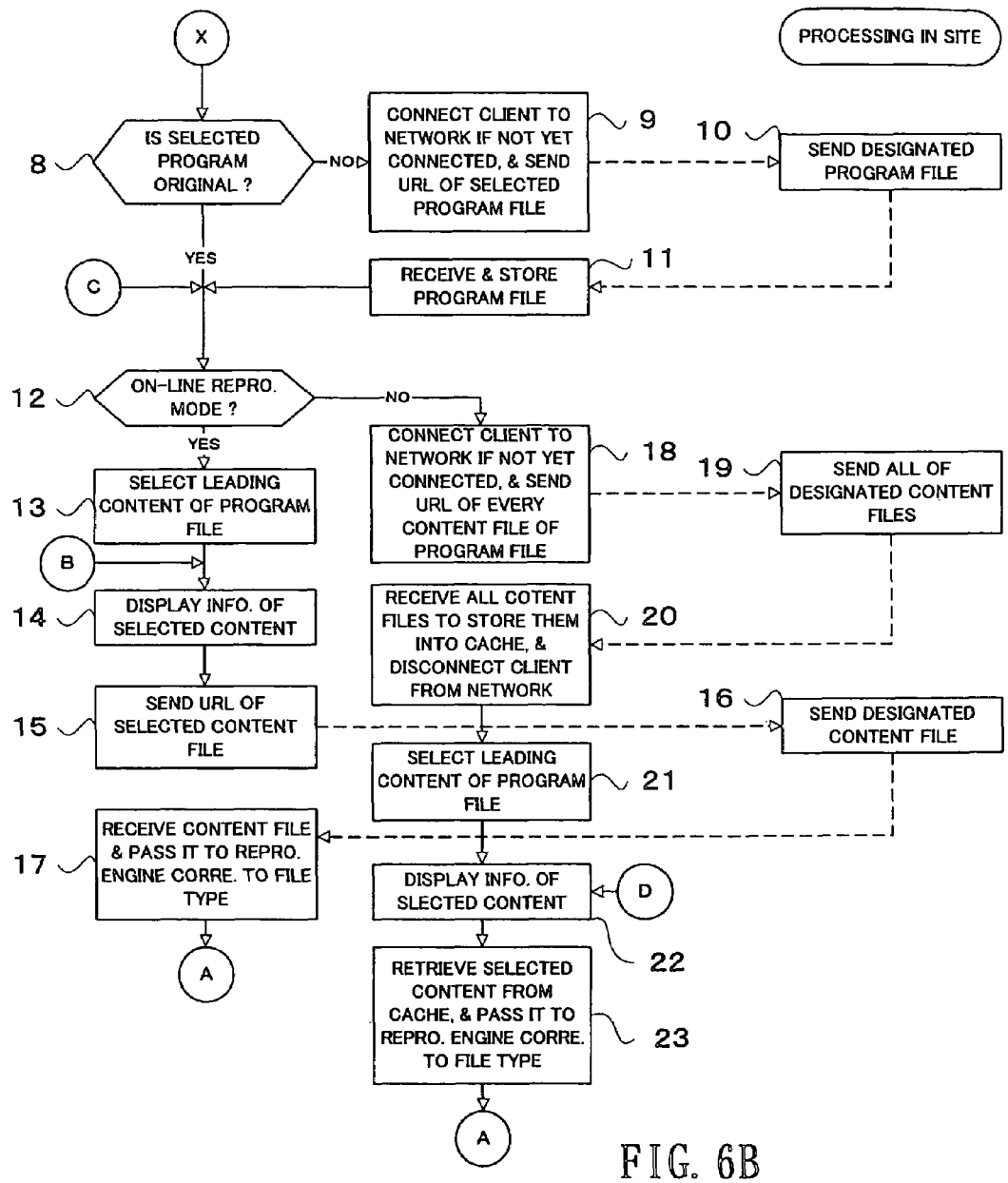
Figure 6C:
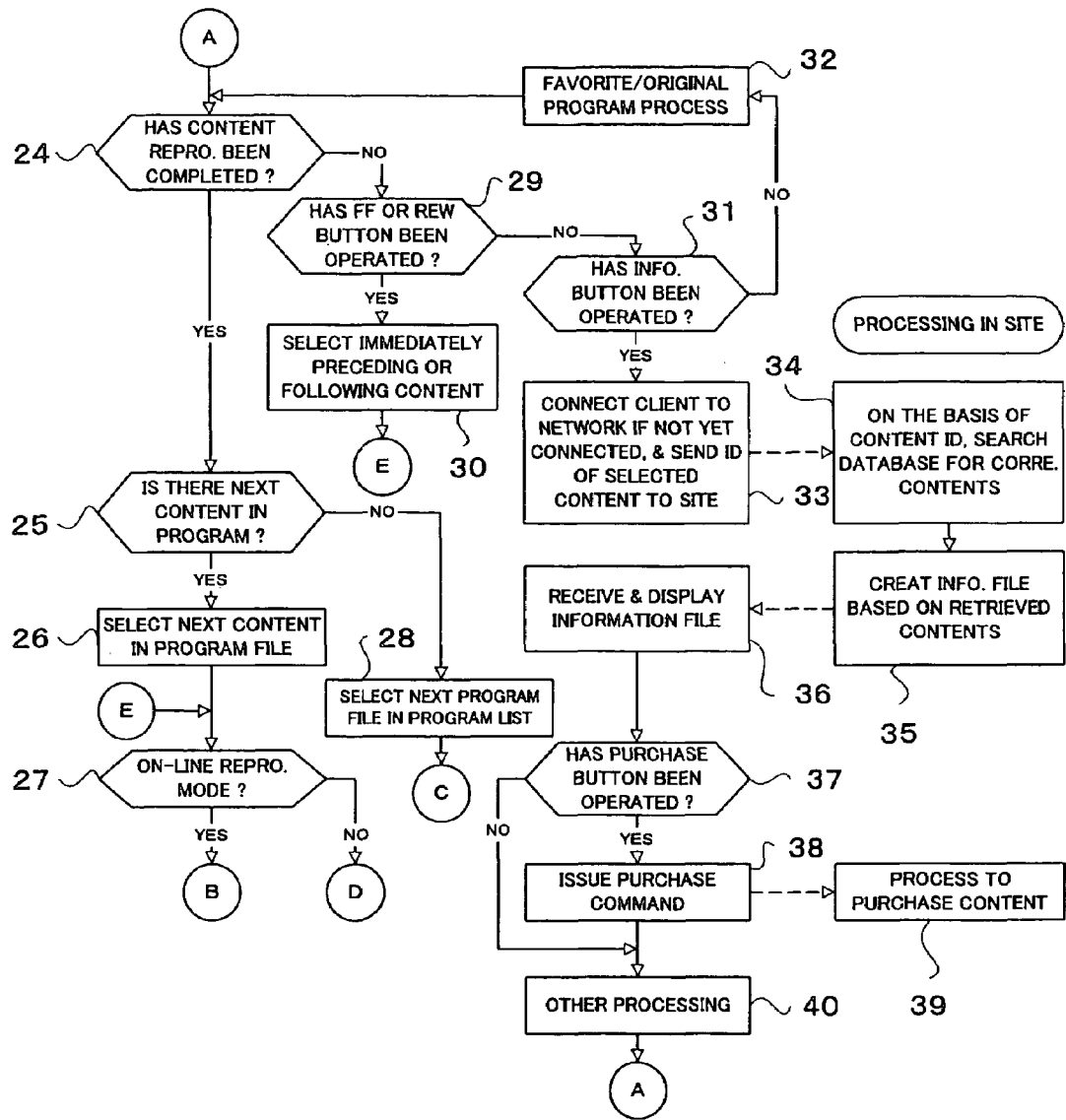

FIGS. 6A to 6C are flow charts showing an example of program reproduction processing that is performed in the program reproduction system of the present invention. Specifically, FIGS. 6A, 6B and 6C show former, intermediate and latter portions, respectively, of the program reproduction processing.

At step 1 of FIG. 6A, the user selects any one of the program serving sites displayed in the site displaying/selecting area on the operation panel (see FIG. 4) installed on the client station PC, in order to reproduce a desired program distributed from the selected site. The sites selectable here include not only the plurality of sites A–N on the communication network X but also a local site (namely, the client station PC). When the local site has been selected (YES determination at step 2), programs names registered in the favorite program list file are displayed, at step 3, in the program displaying/selecting area on the operation panel. When, on the other hand, one of the networked sites A–N has been selected (NO determination at step 2), the URL of the selected site A–N is sent onto the communication network X at step 4. If the client station PC is not yet connected to the communication network X at that time, then it is connected to the communication network X by a dial-up connection or the like. Assuming that the site A has been selected by the user of the client station PC at step 4, the selected site A sends its program list file to the client station PC at step 5. The client station PC receives the program list file from the selected site A and stores the list file into its program list storage section. Then, at step 6, the client station PC displays programs names contained in the stored program list file in the program displaying/selecting area on the operation panel. At next step 7, the interested user can select any one of the programs from the program name list.

Once any one of the programs has been selected by the user, a determination is made as to whether or not the selected program is a user's original program at step 8 of FIG. 6B. If the selected program is an original program (YES determination of step 8), the client station PC jumps to step 12 because the program file is already stored in the client station PC and thus there is no need to acquire any program file from the site A. If answered in the negative at step 8, i.e., if the selected program is not an original program, the client station PC sends the URL of the selected program file to the communication network X in order to acquire the program file from the site A at step 9. If, at that time, the client station PC is not connected to the communication network X (i.e., when the local site has been selected at step 2), then the client station PC is connected to the communication network X. Thus, the program serving site A sends the program file designated by the URL to the client station PC, at step 10. The client station PC receives the program file from the site A and stores it into its program file storage section at step 11. In this way, the interested user can select any desired one of a multiplicity of programs.

After that, program contents are reproduced, in accordance with the selected original program file or acquired program file, in either the on-line reproduction mode or the off-line reproduction mode. The on-line reproduction mode is one selected by an user having his or her client station PC always connected to the communication network X, while the off-line reproduction mode is one selected by an user having his or her client station PC connected to the communication network X by a dial-up connection only when necessary. In the on-line reproduction mode, necessary contents of a program are acquired one by one in real time from the program serving site A whenever the program contents are to be reproduced. In the off-line reproduction mode, on the other hand, all contents of a desired program to be reproduced are acquired collectively from the site A, so that the off-line reproduction mode can significantly reduce the length of the time period when the client station PC has to remain connected to the communication network X. By contrast, the on-line reproduction mode can reduce the waiting or latency time before the content reproduction is initiated and thereby greatly enhance the real-time reproducibility due to the fact that each necessary program content is acquired in real time.

When the program reproduction system is in the on-line reproduction mode as determined at step 12, the reproduction system behaves as follows. In this case, the client station PC automatically selects first or leading content information within the program file, at step 13. Then, at step 14, the client station PC displays basic content information in the basic information displaying area on the operation panel. Although various other information is received or acquired from the program serving site A and then visually displayed, this basic content information is already stored in the program file and hence need not be acquired from the site A each time it is to be displayed, so that the network traffic can be effectively alleviated. After the display, the URL of the selected content information is sent out to the site A at step 15, in response to which the site A sends the corresponding content file at step 16. Then, at step 17, the client station PC receives the content file from the site A and passes it to one of reproduction engines (i.e., dedicated hardware devices or software programs for performing a necessary reproduction process) which corresponds to the type of the file, such as the MIDI, audio, moving picture or still picture, to start the content reproduction.

When the program reproduction system is in the off-line reproduction mode (NO determination at step 12), the system behaves as follows. First, the URL of every content information within the program file is sent from the client station PC to the program serving site A, which in turn sends all of the thus-designated content files to the client station PC at step 19. Here, the order in which the content URLs are sent from the client station PC and the content files are sent from the site A need not necessarily agree with an actual reproducing sequence of the contents in the program. If the client station PC is not connected to the communication network X at that time, the client station PC is connected to the communication network X. The client station PC receives all the content files from the site A and then is disconnected from the communication network X. The received content files are stored into a cache memory at step 20. Then, the client station PC selects first or leading content information within the program file at step 21, displays the basic content information at step 22, and passes each of the content files to one of the reproduction engines which corresponds to the type of the file, such as the MIDI, audio, moving picture or still picture, to start the content reproduction at step 23.

Whereas the client station PC in the preferred embodiment has been described as collectively receiving all contents of a program in the off-line reproduction mode, the present invention is not so limited, and the client station PC may collectively receive all contents of all programs or only designated ones of the programs present in the selected site, in which case the user is allowed to reproduce a plurality of programs in succession by being connected to the communication network only once. Further, although the client station PC in the preferred embodiment has been described as reproducing contents after having downloaded contents files to be reproduced, the client station PC may reproduce the contents immediately as the content files are distributed in streams.

Once the content reproduction has been initiated at steps 17 and 23, the client station PC proceeds to step 24 of FIG. 6C, where a determination is made as to whether the content reproduction has been completed or not. If the content reproduction has been completed (YES determination at step 24), it is further determined at next step 25 whether there is next or other content information in the program file. If answered in the affirmative at step 25, that content information is selected at step 26. Then, if the on-line reproduction mode is on (YES determination at step 27), the client station PC reverts to step 14, but if the off-line reproduction mode is on (NO determination at step 27), the client station PC reverts to step 22. If there is not next or other content information in the program file (NO determination at step 25), a next program file within the program list file is selected at step 28, and the client station PC reverts to step 12. In this way, a plurality of programs can be reproduced one after another. Note that if there is not a next program file within the program list file as determined at step 28, this means that reproduction of all the contents in the program has been completed, and thus the program reproduction processing of FIGS. 6A to 6C may be terminated or the leading program file in the program list may be again selected.

At step 29 of FIG. 6C, a determination is made as to whether the fast-forwarding (FF) button or fast-rewinding (REW) button has been operated or activated during the content reproduction. If the fast-forwarding (FF) button has been activated as determined at step 29, the client station PC, at step 30, selects other content information immediately following the content being currently reproduced within the program file, or if the fast-rewinding (REW) button has been activated, the client station PC, at step 30, selects other content information immediately preceding the currently reproduced content. After step 30, the client station PC reverts to step 27. This way, the user is allowed to skip a non-favorite music piece or listen to a currently-reproduced music piece more than once unlike with an ordinary radio or television program.

When the INFO button has been activated as determined at step 31, the client station PC sends the content ID of the selected program file to the program serving site A at step 33. If the client station PC is not connected to the communication network X at that time, the client station PC is connected to the communication network X. Upon receipt of the content ID from the client station PC, the site A, at step 34, searches through the content database for content files corresponding to the content ID. For instance, if the content ID of a MIDI music piece has been received, the site A searches for audio contents, still picture contents (e.g., a photograph on a CD jacket), miscellaneous information contents (e.g., name, genre, player, lyric writer, composer, label, playing time length, purchase price, etc. of the music piece), music score contents and the like. Then, the site A creates an information file on the basis of the searched content files and sends the thus-created information file to the client station PC at step 35. The client station PC receives the information file from the site A and visually displays it at step 36.

As noted earlier, the purchase button is displayed on an information displaying screen of FIG. 5. By activating the purchase button to purchase a desired content such as a MIDI music piece file (YES determination at step 37), the user is allowed to purchase the desired content and other contents related to the desired content such as an audio content file and music score content file. For that purpose, the client station PC sends a purchase command and the content ID of the desired content to the site A at step 38, in response to which the site A, at step 39, carries out a process pertaining to the requested purchase of the desired content and other contents related to the desired content. Note that the contents acquired for reproduction within the program and the contents purchased here may be in the following relationship. For example, the contents acquired for reproduction within the program may be those covering just a part of a music piece or low-quality sample contents, while the contents purchased here may be those covering the whole of the music piece or high-quality contents. Then, at step 40, other processing is carried out irrespective of whether the purchase button has been activated or not. The other processing of step 40 includes various operations pertaining to information to be displayed in response to a user selection (mouse-clicking) on the information displaying screen; for example, when the item "player" has been selected, step 40 searches for and displays a content pertaining to the player. After completion of the other processing, the client station revers to step 24.

The above-mentioned information-displaying and content purchasing operations are carried out in the same manner for both the program supplied from the site A and the favorite or original program stored locally. Further, these information-displaying and content purchasing operations are carried out even with the FF or REW button activated. Thus, any interested user can acquire information and contents of any desired music piece at any desired time.

When the user has activated the favorite adding button, favorite editing button or original program creating button without activating the INFO button as determined at step 31, a favorite/original program process is performed at step 32.

Figure 7:
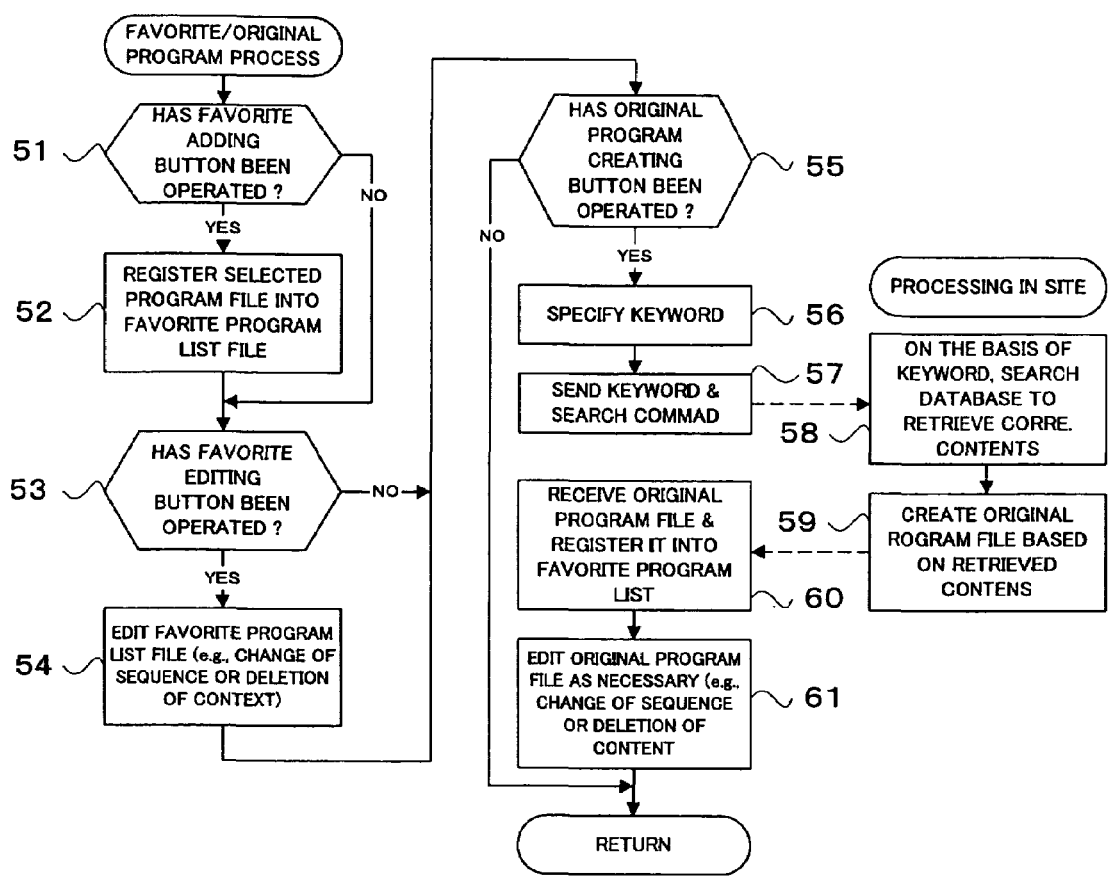
FIG. 7 is a flow chart showing an example of a favorite/original program process performed in the program reproduction system.

FIG. 7 is a flow chart showing an example of the favorite/original program process. When the favorite adding button has been activated as determined at step 51, a currently-selected program file is registered into the favorite program list file at step 52; that is, the program name and URL of the selected program file are additionally registered. When the favorite editing button has been activated and thus an YES determination has been made at step 53, the favorite program list file is edited at step 54; for example, at this step 54, the sequence of the programs in the favorite program list is changed, or a selected one or more of the programs is deleted. The editing of the favorite program list file is carried out by visually showing an editing screen (not shown) on the display to permit desired editing operations by the user utilizing the screen.

Further, when the original program creating button has been activated and thus an YES determination has been made at step 55, the client station PC goes to step 56, where are specified one or more keywords pertaining to a content to be stored as an original program. For example, the player's name, musical genre, etc. may be designated as the keywords. Then, at step 57, the client station PC sends the specified keywords and a search command to the site A. On the basis of the keywords, the site A searches through the content database corresponding contents and lists up and the corresponding contents at step 58. Then, at step 59, the program serving site A creates an original program file based on the listed contents and sends the thus-created original program file to the client station PC. Similarly to ordinary program files, the original program file includes content URLs, content IDs and basic content information; note that the contents in the original program file are arranged in a predetermined order, such as English or Japanese alphabetical order or order in which they have been found. Then, the client station PC receives the original program file from the site A and registers it into the favorite program list at step 60. Then, the user can edit the original program file as necessary at step 61; for example, the user changes the sequence of the contents or deletes a selected one or more of the contents. If a new original program is created in the site A, then the old original program file stored in the client station PC may be discarded, or only new contents may be added to the existing original program file. Alternatively, a plurality of such original program files may be stored.

Although the processing of FIG. 7 has been described to create an original program file by arranging, in a predetermined order, contents listed through a search by the site A, only desired ones of the listed contents may be designated by the client station PC so that the site A can create an original program file of the client-designated contents alone. Further, the program editing function may be possessed by the site A rather than the client station PC; in such a case, an editing command is issued from the client station PC, on the basis of which the site A performs editing to change the sequence of the contents and/or delete a selected one or more of the contents.

Although not specifically shown in the above-described processing flows of FIGS. 6A–6C and 7, reproduction of any content can be stopped compulsorily by activating the stop button of FIG. 4 and can be resumed by again operating the stop button. Further, arrangements may be made to optionally terminate the above-described operations by the user giving an instruction.

In the above-described program reproduction system, each program is caused to progress by reproducing contents sequentially one after another. Namely, because of the sequential or successive arrangement of contents in a program (program file), these contents can not be reproduced concurrently in a parallel fashion. However, the present invention is not so limited, and programs (program files) may be constructed in such a manner that a plurality of contents can be reproduced concurrently in a parallel fashion. Such an arrangement permits program making which can reproduce a MIDI music piece at the same time an audio MC speech file is reproduced, or reproduce a MIDI music piece while switching one still picture to another as a background picture.

FIG. 8 is a diagram showing an example of a program file which is arranged to allow a plurality of contents to be reproduced concurrently in a parallel fashion. As shown, each program consists of a plurality of tracks which correspond to various different types of content files such as MIDI, audio, moving picture and still picture files. Namely, in this example, two or more types of content files are not stored mixedly in a single track, and the individual contents can be read out from the plurality of tracks in a parallel fashion (without ovelapping each other) and passed to respective dedicated reproduction engines for reproduction purposes. That is, the reproduction engines also operate in parallel in corresponding relation to the content types. Process for reproducing data of a plurality of tracks in parallel is well known in the field of automatic performance and will not be described here. Note that reproduction timing of successive contents in a single track is set to not overlap each other. After readout of such a program file, the program file is subjected to the same operations as described above.

The plurality of tracks may be implemented by dividing a same storage area as shown in FIG. 8 (i.e., storing each type of content in a different divided track), or by imparting track identifying data to each content instead of diving the storage area (i.e., storing various contents mixedly in the tracks with track identifying data).

In reproducing a plurality of contents concurrently, it is desirable to impart a fade-in/fade-out effect or the like. For impartment of such a fade-in/fade-out effect, fading-in and fading-out contents may be prestored, or a command to impart fade-in and fade-out may be embedded in a program along with fade-in/fade-out timing information so that the fade-in and fade-out is effected upon readout of such a command. Where the contents concern a music piece or MC speech, a command to impart an acoustic effect, such as a reverberation effect, may be embedded in addition to the fade-in/fade-out command. Further, where the contents concern a still or moving picture, there may be embedded a command to impart a video effect such as a mosaic or wipe effect. These effect may be imparted during reproduction of the contents rather than at the start or end timing of the content reproduction.

Figure 9A:
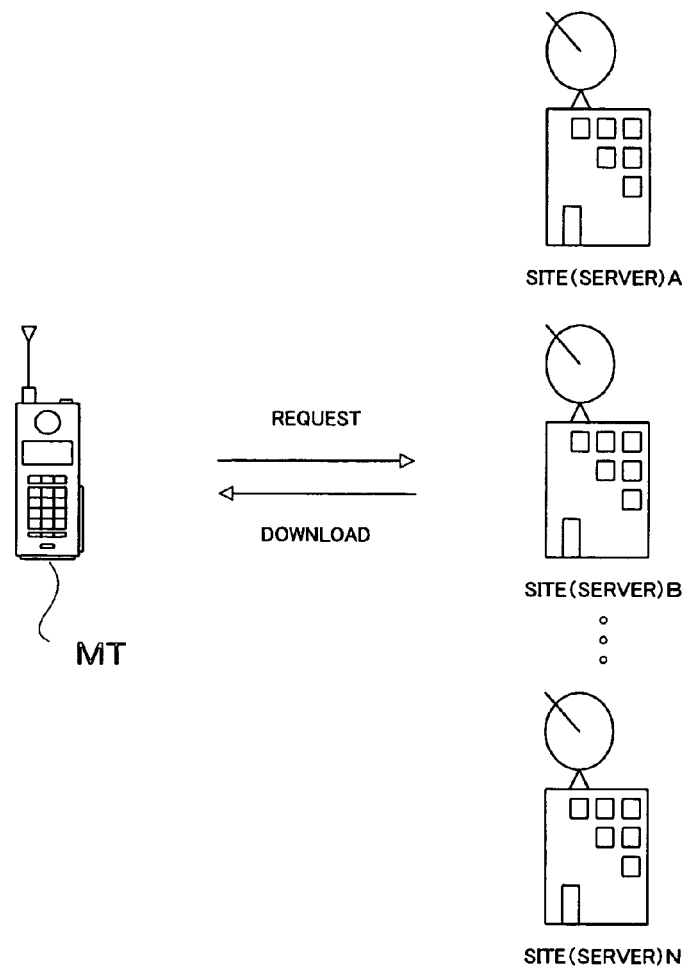
FIG. 9A is a diagram showing an example where a client station is a portable-type communication terminal.
Figure 9B:
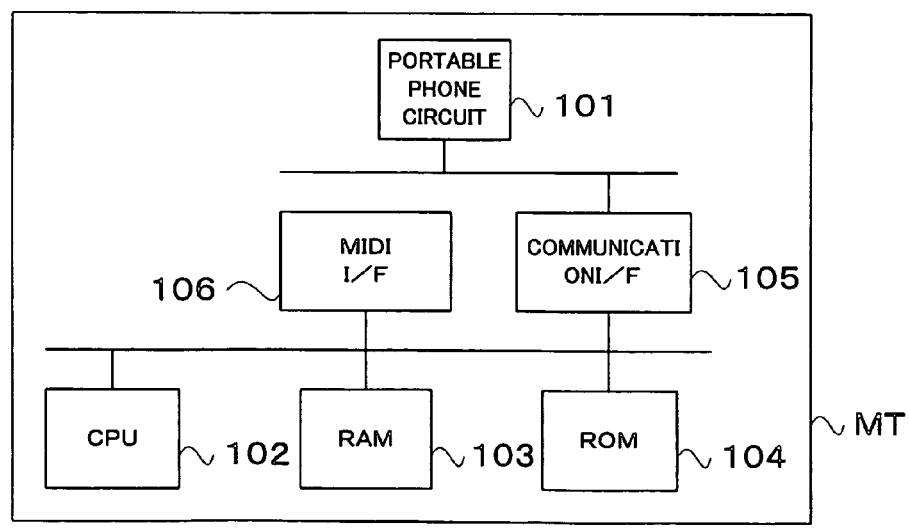
FIG. 9B is a block diagram showing an exemplary inner structure of the portable-type communication terminal having a tone generating function.

FIG. 9A is a diagram showing an example where the client station PC is a portable-type communication terminal MT, such as a cellular phone, PHS (Personal Handy Phone System in Japan) phone or other mobile terminal equipment. Assume here that the portable-type communication terminal MT has a tone generating function such as a conventional tone generator or sequencer function. FIG. 9B is a block diagram showing an exemplary inner structure of the portable-type communication terminal MT having such a tone generating function. The portable-type communication terminal MT includes a conventional portable phone circuit 101, and a microcomputer installed therein and including a CPU 102, a RAM 103 and a ROM 104. The portable phone circuit 101 and microcomputer communicate with each other via a communication interface 105. The portable phone circuit 101 has an Internet function and a simplified Internet function. By establishing a radio communication connection between the terminal MT and any of the program serving sites A–N, information communication between the internal microcomputer and the site A–N is permitted via the communication interface 105. Program and data necessary for implementing the tone generating function are stored in the ROM 104 along with a program reproducing program (application software) of the present invention. In this case, the ROM 104 may comprise a rewritable memory, such as a flash ROM so that the tone generating program, data and/or program reproducing program of the present invention can be updated whenever necessary.

Let's assume here that various switches associated with the portable phone circuit 101 are used to perform functions of various input buttons of the communication terminal MT. In this case, information representing user's switch operation generated by the portable phone circuit 101 is received by the above-mentioned internal microcomputer via the internal communication interface 105, and the above-described various operations are carried out in accordance with input operation signals generated via the microcomputer. Further, various data, such as contents received from any of the program serving sites A–N, are received from the portable phone circuit 101 and passed via the communication interface 105 to the internal microcomputer for storage into the RAM 103. The thus-received contents and other data are passed via the interface 105 to the portable phone circuit 101 to be visually shown on a display associated with the phone circuit 101. Further, the received contents and other data, or contents and other data generated by the internal microcomputer can be delivered via the communication interface 105 to the portable phone circuit 101, from which they can be transmitted via a radio telephone line to another portable-type communication terminal MT or personal computer (e.g., by being attached to an e-mail) as desired. In addition, the contents generated by the internal microcomputer can be passed via the communication interface 105 to the portable phone circuit 101 so that they are audibly sounded through an internal speaker or visually shown on the display. The portable-type communication terminal MT may further include a MIDI interface 106 for exchange of MIDI performance data with the outside. Furthermore, any desired one of MIDI, audio, moving picture and still picture files received from any one of the program serving sites (servers) A–N may be stored into an appropriate storage so that it can be used as incoming-call informing melody or picture data or melody to be sounded during a call-holding period. Moreover, any one of the received MIDI, audio, moving picture and still picture files may be used as background music or visual image during a telephone call.

Also note that when some content is purchased by the user, the purchase price of the content may be added to the user's charge for using the communication terminal MT, or may be billed to the user separately from the charge for using the communication terminal MT. In the case where the portable-type communication terminal MT is used as the client station PC like this, it may be equipped with only some, rather than all, of the above-mentioned functions.

Whereas the fast-forwarding (FF) or fast-rewinding (REW) button has been described as selecting another content immediately preceding or following a currently-reproduced content, it may be used to move the reproduction forward or backward by an amount corresponding to a predetermined time. Further, when a given content immediately preceding or following a currently-reproduced content is to be selected for a type of program whose contents of a plurality of tracks are reproduced concurrently, arrangements may be made for the user to decide a particular one of the tracks for which to move the reproduction forward or backward by one content or to fixedly preset such a particular one of the tracks for which to move the reproduction forward or backward. Furthermore, it is not always necessary for the inventive program reproduction system to possess both of the functions to fast-forward or fast-rewind the content, and only either one of the functions may be possessed. Moreover, the inventive system may be arranged to be able to fast-forward or fast-rewind during a temporary stop of the content reproduction instead of being able to fast-forward or fast-rewind during the content reproduction.

Display of various and instruction for purchasing a content may be performed using a Web browser. Namely, a Web browser process may be activated separately from the above-described client station processing so that the information display and content purchase instruction can be made in the Web browser process. Besides, the information display and content purchase instruction may be enabled during a temporary stop of the content reproduction rather than during the course of the content reproduction.

Program files, content files and various other data may be supplied from an external storage medium to the inventive program reproduction system, or may be supplied from an external device via a communication interface to the sites and/or client station.

Content information, such as program files, may be stored time-serially in successive storage areas, or content information stored in disbursed storage areas may be managed as a time-serial succession of data. Namely, it does not matter whether or not the content information is stored in successive storage areas, as long as it can be managed as a time-serial succession of data.

Moreover, the above-mentioned functions of the present invention may be implemented by use of resources (such as a not-shown CPU, RAM an ROM) within the portable phone circuit 101, rather than by the internal microcomputer provided separately from the portable phone circuit 101.

Furthermore, the music files employed in connection with the present invention need not necessarily be in the MIDI format and may be prepared by encoding music performance information using some encoding scheme. The audio files need not be in the PCM format and may be in any other suitable compressed data format such as ADPCM or DPCM. Similarly, the moving picture and still picture files may be in a suitable compressed data format.

In summary, the present invention is characterized primarily in that program files including various content information, such as content URLs, are prestored in the client station so that necessary contents are read out collectively or one by one from a selected server on the basis of a selected one of the program files. By being thus arranged, the present invention can appropriately reproduce even a program comprising a mixture of a plurality of contents of different characters and thus provide programs of a great variety of contents. Further, by the capability to reproduce a program on the content-by-content basis, the present invention allows a user to reproduce the program while optionally fast-forwarding or fast-rewinding a part of the same. Further by the capability to designate any desired content in a program file to thereby selectively read out the designated content from a server, the user can purchase any desired content. Further, the user is allowed to freely create his or her own original program.

In addition, because various content-related information can be read out, content by content, on the basis of a program file, the present invention advantageously allows the user to view or gain information corresponding to any desired information.

What is claimed is:

1. A program reproduction system for transmitting and reproducing contents via a communication network, said program reproduction system comprising:

a program serving site having a memory storing a plurality of types of contents having different characters and adapted to supply a program file defining a reproducing sequence of a plurality of contents including contents of different characters; and a client connectable to said program serving site via the communication network and having a plurality of types of reproduction engines capable of reproducing said plurality of types of contents having different characters, said client being adapted to:

receive a program file from said program serving site;

receive, from said program serving site, contents specified by the received program file; and successively reproduce each of the received contents in a reproducing sequence defined by the received program file, using any one of the reproduction engines which corresponds to the type of the content to be reproduced, wherein the received contents are automatically reproduced in accordance with the reproducing sequence.

2. A program reproduction system as claimed in claim 1 wherein said client includes an interface to the communication network and a processor coupled with said interface, said processor being connected to the communication network via said interface and adapted to:

receive a program file from said program serving site via the communication network;

receive contents specified by the received program file, from said program serving site via the communication network; and reproduce each of the received contents in a reproducing sequence defined by the received program file, using any one of the reproduction engines which corresponds to the type of the received content.

3. A program reproduction system as claimed in claim 1 wherein said plurality of types of contents having different characters include a content of music performance information prepared in a predetermined data format and a content of audio sound or voice.

4. A program reproduction system as claimed in claim 1 wherein said program serving site is capable of supplying a plurality of program files, and said client is adapted to selectively designate a desired one of the plurality of program files and receive the designated desired program file from said program serving site.

5. A program reproduction system as claimed in claim 4 wherein said client is adapted to selectively designate a desired one of the plurality of program files and make a program list containing the designated desired program file.

6. A program reproduction system as claimed in claim 1 wherein said client includes a memory, an operator and a processor coupled with said memory and said operator, and said processor is adapted to, in response to an operation of said operator, edit the reproducing sequence of the contents in the received program file to thereby provide an edited program file and store the edited program file into said memory.

7. A program reproduction system as claimed in claim 1 wherein said client is a portable-type communication terminal.

8. A program reproduction system as claimed in claim 1 wherein said program file contains storage location information that is indicative of a storage location of each of the contents in said program serving site, and said client receives a desired one of the contents from said program serving site on the basis of the storage location information.

9. A program reproduction system as claimed in claim 1 wherein the program file to be received by said client defines a reproducing sequence of a plurality of contents satisfying the search condition specified by said client to said program serving site.

10. A program reproduction system as claimed in claim 9 wherein said program serving site makes the search in accordance with the search condition specified by said client, makes a program file containing the retrieved contents and sends the made program file to said client, and
wherein said client receives, from said program serving site, the made program file containing the retrieved contents.

11. A program reproduction system as claimed in claim 10 wherein said client includes an operator and a processor coupled with said operator, and said processor is adapted to, in response to an operation of said operator, edit the reproducing sequence of the contents in the program file received from said program serving site.

12. A program reproduction system for transmitting and reproducing contents via a communication network, said program reproduction system comprising:
a program serving site including a memory storing a plurality of contents and adapted to supply a program file defining a reproducing sequence of a plurality of contents; and
a client connectable to said program serving site via the communication network and including a reproduction engine for reproducing contents and an operator adapted to give at least one of fast-forwarding and fast-rewinding instructions, said client being adapted to:
receive a program file from said program serving site;
receive, from said program serving site, contents specified by the received program file;
successively reproduce each of the received contents in a reproducing sequence defined by the received program file, using said reproduction engine, wherein the received contents are automatically reproduced in accordance with the reproducing sequence; and
fast-forward or fast-rewind a currently-reproduced content in the program file to be reproduced, in accordance with the fast-forwarding or fast-rewinding instruction given via said operator.

13. A program reproduction system for transmitting and reproducing contents via a communication network, said program reproduction system comprising:
a program serving site including a memory storing a plurality of contents and adapted to supply a program file defining a reproducing sequence of a plurality of contents and content-related information for individual ones of the contents; and
a client connectable to said program serving site via the communication network and including a reproduction engine for reproducing contents and a display section, said client being adapted to:
receive a program file from said program serving site;
receive, from said program serving site, contents specified by the received program file;
successively reproduce each of the received contents in a reproducing sequence defined by the received program file, using said reproduction engine wherein the received contents are automatically reproduced in accordance with the reproducing sequence; and
receive, from said program serving site, the content-related information for each received content or each content which is being currently reproduced and display the received content-related information on said display section.

14. A program reproduction system as claimed in claim 13 wherein said program file contains identification information identifying the individual contents, and said client receives the content-related information from said program serving site on the basis of the identification information of the currently reproduced content.

15. A program reproduction system as claimed in claim 13 wherein said program serving site includes a memory storing content-related information for individual contents.

16. A program reproduction system for transmitting and reproducing contents via a communication network, said program reproduction system comprising:
a program serving site including a memory storing a plurality of contents, and adapted to supply a program file defining a reproducing sequence of a plurality of contents and perform a content selling process upon receipt of a content purchase request; and
a client connectable to said program serving site via the communication network and including a reproduction engine for reproducing contents and an operator, said client being adapted to:
receive a program file from said program serving site;
receive, from said program serving site, contents specified by the received program file;
successively reproduce each of the received contents in a reproducing sequence defined by the received program file, using said reproduction engine wherein the received contents are automatically reproduced in accordance with the reproducing sequence; and
generate a content purchase request in response to an operation of said operator and transmit the content purchase request to said program serving site.

17. A program reproduction system as claimed in claim 16 wherein said client generates the content purchase request asking for one of the contents which is being currently reproduced and transmits the content purchase request to said program serving site, and wherein, in response to the content purchase request from said client, said program serving site performs the selling process to sell said client a regular content corresponding to the content currently reproduced by said client.

18. A program reproduction system as claimed in claim 16 wherein said program serving site supplies said client with a predetermined sample content in response to a request from said client asking for any one of the contents specified by the program file, and wherein, for each of the contents having been finally determined to be sold via the selling process, said program serving site supplies said client with a non-sample regular content.

19. A method of transmitting contents from a program serving site via a communication network to a client and reproducing the transmitted contents by the client, said program serving site including a database storing a plurality of types of contents having different characters and adapted to supply a program file defining a reproducing sequence of a plurality of contents including contents having different characters, said method comprising the steps of:
causing said client to receive a program file from said program serving site;
causing said client to receive, from said program serving site, contents specified by the received program file; and
causing said client to successively reproduce each of the received contents in a reproducing sequence defined by the received program file, using any one of the reproduction engines which corresponds to the type of the content to be reproduced, wherein the received contents are automatically reproduced in accordance with the reproducing sequence.

20. A method as claimed in claim 19 wherein the program file to be received by said client defines a reproducing sequence of a plurality of contents satisfying the search condition specified by said client to said program serving site.

21. A machine-readable storage medium containing a group of instructions to cause said machine to execute a method of transmitting contents from a program serving site via a communication network to a client and reproducing the transmitted contents by the client, said program serving site including a database storing a plurality of types of contents having different characters and adapted to supply a program file defining a reproducing sequence of a plurality of contents including contents having different characters, said method being executed in said client, said method comprising the steps of:
- causing said client to receive a program file from said program serving site;
- causing said client to receive, from said program serving site, contents specified by the received program file; and
- causing said client to successively reproduce each of the received contents in a reproducing sequence defined by the received program file, using any one of the reproduction engines which corresponds to the type of the content to be reproduced, wherein the received contents are automatically reproduced in accordance with the reproducing sequence.

22. A machine-readable storage medium as claimed in claim 21 wherein the program file to be received by said client defines a reproducing sequence of a plurality of contents satisfying the search condition specified by said client to said program serving site.

23. A method of transmitting contents from a program serving site via a communication network to a client and reproducing the transmitted contents by the client, said program serving site including a database storing a plurality of contents and adapted to supply a program file defining a reproducing sequence of a plurality of contents, said method comprising the steps of:
- causing said client to receive a program file from said program serving site;
- causing said client to receive, from said program serving site, contents specified by the received program file;
- causing said client to successively reproduce each of the received contents in a reproducing sequence defined by the received program file wherein the received contents are automatically reproduced in accordance with the reproducing sequence;
- giving a fast-forwarding or fast-rewinding instruction; and
- causing said client to fast-forward or fast-rewind one of the contents which is being currently reproduced by said client, in accordance with the fast-forwarding or fast-rewinding instruction.

24. A machine-readable storage medium containing a group of instructions to cause said machine to execute a method of transmitting contents from a program serving site via a communication network to a client and reproducing the transmitted contents by the client, said program serving site including a database storing a plurality of contents and adapted to supply a program file defining a reproducing sequence of a plurality of contents, said method being executed in said client, said method comprising the steps of:
- causing said client to receive a program file from said program serving site;
- causing said client to receive, from said program serving site, contents specified by the received program file;
- causing said client to successively reproduce each of the received contents in a reproducing sequence defined by the received program file, wherein the received contents are automatically reproduced in accordance with the reproducing sequence;
- giving a fast-forwarding or fast-rewinding instruction; and
- causing said client to fast-forward or fast-rewind one of the contents which is being currently reproduced by said client, in accordance with the fast-forwarding or fast-rewinding instruction.

25. A method of transmitting contents from a program serving site via a communication network to a client and reproducing the transmitted contents by the client, said program serving site including a database storing a plurality of contents and adapted to supply a program file defining a reproducing sequence of a plurality of contents, said method comprising the steps of:
- causing said client to receive a program file from said program serving site;
- causing said client to receive, from said program serving site, contents specified by the received program file;
- causing said client to successively reproduce each of the received contents in a reproducing sequence defined by the received program file, wherein the received contents are automatically reproduced in accordance with the reproducing sequence; and
- causing said client to display, on a display section, information related to each received content or each content which is being currently reproduced.

26. A machine-readable storage medium containing a group of instruction to cause said machine to execute a method of transmitting contents from a program serving site via a communication network to a client and reproducing the transmitted contents by the client, said program serving site including a database storing a plurality of contents and adapted to supply a program file defining a reproducing sequence of a plurality of contents, said method being executed in said client, said method comprising the steps of:
- receiving a program file from said program serving site;
- receiving, from said program serving site, contents specified by the received program file;
- successively reproducing each of the received contents in a reproducing sequence defined by the received program file, wherein the received contents are automatically reproduced in accordance with the reproducing sequence; and
- displaying, on a display section, information related to each received content or each content which is being currently reproduced.

27. A method of transmitting contents from a program serving site via a communication network to a client and reproducing the transmitted contents by the client, said program serving site including a database storing a plurality of contents and adapted to supply a program file defining a reproducing sequence of a plurality of contents, said method comprising the steps of:
- causing said client to receive a program file from said program serving site;
- causing said client to receive, from said program serving site, contents specified by the received program file;
- causing said client to successively reproduce each of the received contents in a reproducing sequence defined by the received program file, wherein the received contents are automatically reproduced in accordance with the reproducing sequence;

causing client to generate a content purchase request asking for a desired content and transmit the content purchase request to said program serving site; and causing said program serving site to perform a process to sell the desired content in response to the content purchase request from said client.

28. A machine-readable storage medium containing a group of instructions to cause said machine to execute a method of transmitting contents from a program serving site via a communication network to a client and reproducing the transmitted contents by the client, said program serving site including a database storing a plurality of contents and adapted to supply a program file defining a reproducing sequence of a plurality of contents, said method being executed in said client, said method comprising the steps of:

receiving a program file from said program serving site;

receiving, from said program serving site, contents specified by the received program file;

successively reproducing each of the received contents in a reproducing sequence defined by the received program file, wherein the received contents are automatically reproduced in accordance with the reproducing sequence; and generating a content purchase request asking for a desired content and transmitting the content purchase request to said program serving site, the content purchase request causing said program serving site to start performing a predetermined process to sell the desired content.

29. A machine-readable storage medium containing a data group of a program file, the program file being used when contents are to be transmitted from a program serving site via a communication network to a client for reproduction by the client, said program file defining a reproducing sequence of a plurality of contents and including content information defining individual ones of the plurality of contents, said content information for each of the contents including:

storage location information that is indicative of a storage location of the content in said program serving site;

identification information identifying the content; and displaying information pertaining to the content, wherein said storage location information is usable to retrieve the content from said program serving site and said displaying information is usable to make a visual display pertaining to the content.

30. A server apparatus connectable to a client terminal apparatus via a communication network, said server apparatus comprising:

a first storage section that stores a program file defining a reproducing sequence of a plurality of items of contents information including different types of contents;

a second storage section that stores the plurality of items of contents information including different types of contents defined by the program file;

a first supply section that supplies said client terminal apparatus with the program file stored in said first storage section; and a second supply section that supplies, via the communication network, said client terminal apparatus with the plurality of items of contents information stored in said second storage section and defined by the program file, to thereby allow said client terminal apparatus to successively reproduce each of the received contents information in a reproducing sequence defined by the received program file wherein the received contents information are automatically reproduced in accordance with the reproducing sequence.

31. A server apparatus as claimed in claim 30 wherein the different types of contents include trial contents for prompting purchase of regular contents corresponding to the trial contents.

32. A server apparatus connectable to a client terminal apparatus via a communication network, said server apparatus comprising:

a first storage section that stores a program list file for prompting said client terminal apparatus to select a desired program file from among a plurality of program files;

a second storage section that stores a program file defining a reproducing sequence of a plurality of items of contents information including different types of contents;

a first supply section that supplies said client terminal apparatus with the program list file stored in said first storage section;

a reception section that receives a result of program file selection by said client terminal apparatus based on the program list file supplied by said first supply section; and a second supply section that, on the basis of the result of the program file selection by said client terminal apparatus, supplies said client terminal apparatus with the program file stored in said second storage section, to thereby allow said client terminal apparatus to receive, via the communication network, the plurality of items of contents information defined by the program file supplied by said second supply section, wherein said client terminal apparatus successively reproduces individual ones of the received plurality of items of contents information in accordance with the reproducing sequence, and wherein the reproduction of said plurality of items of contents information in accordance with the reproducing sequence is carried out automatically.

33. A server apparatus as claimed in claim 32 wherein the plurality of items of contents information including different types of contents include contents of music performance information organized in a predetermined data format and audio sound contents.

34. A server apparatus connectable to a client terminal apparatus via a communication network, said server apparatus comprising:

a storage section that stores a plurality of contents information;

a reception section that receives a given search condition from said client terminal apparatus;

a search section that makes a search through said storage section to retrieve one or more items of the contents information satisfying the given search condition;

a creation section that creates a program file defining a reproducing sequence of a plurality of items of contents information including the retrieved contents information; and a supply section that supplies the created program file to said client terminal apparatus, whereby the plurality of items of contents information are supplied via the communication network to said client terminal apparatus for reproduction in the reproducing sequence defined by the program file, wherein said client terminal apparatus successively reproduces individual ones of the supplied plurality of items of contents information in accordance with the reproducing sequence and wherein the reproduction of said plurality of items of contents information in accordance with the reproducing sequence is carried out automatically.

35. A server apparatus connectable to a client terminal apparatus via a communication network, said server apparatus comprising:
a storage section that stores a program file defining a reproducing sequence of a plurality of items of contents information and including contents-related information pertaining to individual ones of the plurality of items of contents information and intended for display on a display section of said client terminal apparatus; and
a supply section that supplies the program file, stored in said storage section, to said client terminal apparatus,
whereby the plurality of items of contents information defined by the program file are supplied via the communication network to said client terminal apparatus and the contents-related information included in the program file is displayed on the display section of said client terminal apparatus,
wherein said client terminal apparatus successively reproduces individual ones of the supplied plurality of items of contents information in accordance with the reproducing sequence, and wherein the reproduction of said plurality of items of contents information in accordance with the reproducing sequence is carried out automatically.

36. A server apparatus as claimed in claim 35 wherein at least one of the items of contents information is music contents information organized in a predetermined data format, and the contents-related information pertaining to the music contents information represents at least one of a name and genre of a music piece, names of an artist, lyric writer and composer of the music piece and a label name and performance time length of the music piece.

37. A server apparatus connectable to a client terminal apparatus via a communication network, said server apparatus comprising:
a first storage section that stores a program file defining a reproducing sequence of a plurality of items of trial contents information;
a second storage section that stores the plurality of items of trial contents information;
a first supply section that supplies the program file, stored in said first storage section, to said client terminal apparatus;
a second supply section that, on the basis of the program file supplied to said client terminal apparatus, supplies the trial contents information, stored in said second storage section, to said client terminal apparatus;
a reception section that receives, from said client terminal apparatus, a purchase request for regular, to-be-purchased contents information corresponding to the trial contents information; and
a billing section that bills a user of said client terminal apparatus in accordance with the purchase request received from said client terminal apparatus,
wherein said client terminal apparatus successively reproduces individual ones of the supplied trial contents information in accordance with the reproducing sequence, and wherein the reproduction of said trial contents information in accordance with the reproducing sequence is carried out automatically.

38. A client terminal apparatus for receiving contents information via a communication network, said client terminal apparatus comprising:
a first reception section that receives, from a server apparatus connected to the communication network, a program file defining a reproducing sequence of a plurality of items of contents information including different types of contents;
a transmission section that transmits, onto the communication network, information for requesting said server apparatus to supply said client terminal apparatus with each of the plurality of items of contents information defined by the program file;
a second reception section that receives, via the communication network, the plurality of items of contents information defined by the program file; and
a plurality type of reproduction engines that successively reproduce the plurality of items of contents information, received by said second reception section, in accordance with the reproducing sequence defined by the program file and in accordance with the types of contents, wherein the received plurality of items of contents information are automatically reproduced in accordance with the reproducing sequence.

39. A client terminal apparatus as claimed in claim 38 wherein the different types of contents include trial contents for prompting purchase of regular contents corresponding to the trial contents.

40. A client terminal apparatus for receiving contents information via a communication network, said client terminal apparatus comprising:
a first reception section that receives, from a server apparatus connected to the communication network, a program list file for prompting said client terminal apparatus to select a desired program file from among a plurality of program files;
a selection section that selects a desired program file on the basis of the program list file received by said first reception section;
a transmission section that transmits, to said server apparatus, a result of program file selection by said selection section;
a second reception section that receives, from said server apparatus, the desired program file that corresponds to the result of program file selection by said client terminal apparatus and defines a reproducing sequence of a plurality of items of contents information including different types of contents;
a third reception section that receives, via the communication network, the plurality of items of contents information in accordance with the desired program file received by said second reception section; and
a reproduction section that successively reproduces individual ones of the received plurality of items of contents information in accordance with the reproducing sequence defined by the program file, wherein the reproduction of said plurality of items of contents information in accordance with the reproducing sequence is carried out automatically.

41. A client terminal apparatus as claimed in claim 40 which further comprises a reproduction section that reproduces the contents information received by said third reception section.

42. A client terminal apparatus as claimed in claim 40 which further comprises an editing section that edits the reproducing sequence of the contents information in the program file received by said second reception section.

43. A client terminal apparatus as claimed in claim 40 wherein the plurality of items of contents information including different types of contents include contents of music performance information organized in a predetermined data format and audio sound contents.

44. A client terminal apparatus as claimed in claim 40, which further comprises a specifying section that specifies a given search condition to said server apparatus connected to the communication network, and wherein said first reception section receives, from said server apparatus, a program file defining a reproducing sequence of a plurality of items of contents information satisfying the specified search condition.

45. A client terminal apparatus as claimed in claim 44 which further comprises an editing section that edits the reproducing sequence defined by the program file received by said first reception section.

46. A client terminal apparatus for receiving contents information via a communication network, said client terminal apparatus comprising:

a first reception section that receives, from a server apparatus on the communication network, a program file defining a reproducing sequence of a plurality of items of contents information;

a second reception section that, on the basis of the program file received by said first reception section, receives, via the communication network, the contents information defined by the received program file;

a reproduction section that successively reproduces the contents information, received by said second reception section, in accordance with the reproducing sequence defined by the program file received by said first reception section, wherein the received contents information are automatically reproduced in accordance with the reproducing sequence; and a fast-forwarding section that fast-forwards a reproduced position of the contents information in accordance with an instruction by a user.

47. A client terminal apparatus as claimed in claim 46 which further comprises a display section capable of displaying an image, and wherein the instruction by the user is given by the user operating a fast-forwarding operator displayed on said display section.

48. A client terminal apparatus as claimed in claim 46 wherein said second reception section makes a request to said server apparatus for the contents information, defined by the program file, in accordance with the reproducing sequence defined by the program file and receives the contents information supplied by said server apparatus in response to the request, and wherein, when a fast-forwarding instruction is given by the user, said fast-forwarding section makes a request to said server apparatus for given contents information specified at a relatively rear place in the reproducing sequence defined by the program file, and then said fast-forwarding section receives the given contents information from said server apparatus to thereby fast-forward the reproduced position.

49. A client terminal apparatus for receiving contents information via a communication network, said client terminal apparatus comprising:

a first reception section that receives, from a server apparatus on the communication network, a program file defining a reproducing sequence of a plurality of items of contents information;

a second reception section that, on the basis of the program file received by said first reception section, receives, via the communication network, the contents information defined by the received program file;

a reproduction section that successively reproduces the contents information, received by said second reception section, in accordance with the reproducing sequence defined by the received program file, wherein the received contents information are automatically reproduced in accordance with the reproducing sequence; and a fast-rewinding section that fast-rewinds a reproduced position of the contents information in accordance with an instruction by a user.

50. A client terminal apparatus as claimed in claim 49 which further comprises a display section capable of displaying an image, and wherein the instruction by the user is given by the user operating a fast-rewinding operator displayed on said display section.

51. A client terminal apparatus as claimed in claim 49 wherein said second reception section makes a request to said server apparatus for the contents information, defined by the program file, in accordance with the reproducing sequence defined by the program file and receives the contents information supplied by said server apparatus in response to the request, and wherein, when a fast-rewinding instruction is given by the user, said fast-rewinding section makes a request to said server apparatus for given contents information specified at a relatively fore place in the reproducing sequence defined by the program file, and then said fast-rewinding section receives the given contents information from said server apparatus to thereby fast-rewind the reproduced position.

52. A client terminal apparatus for receiving contents information via a communication network, said client terminal apparatus comprising:

a first reception section that receives, from a server apparatus connected to the communication network, a program file defining a reproducing sequence of a plurality of items of contents information and including contents-related information pertaining to individual ones of the items of contents information;

a second reception section that receives, via said communication network, the contents information defined by the program file received by said first reception section; and a display section that makes a display based on the contents-related information received by said first reception section a reproduction section that successively reproduces individual ones of the received contents information in accordance with the reproducing sequence defined by the program file, wherein the reproduction of said contents information in accordance with the reproducing sequence is carried out automatically.

53. A client terminal apparatus as claimed in claim 52 wherein at least one of the items of contents information is music contents information organized in a predetermined data format, and the contents-related information pertaining to the music contents information represents at least one of a name and genre of a music piece, names of an artist, lyric writer and composer of the music piece and a label name and performance time length of the music piece.

54. A client terminal apparatus connectable to a server via a communication network, said client terminal apparatus comprising:
- a first reception section that receives, from said server apparatus, a program file defining a reproducing sequence of a plurality of items of trial contents information;
- a second reception section that, on the basis of the program file received by said first reception section, receives, via said communication network, the trial contents information defined by the program file;
- a reproduction section that successively reproduces individual ones of the received trial contents information in accordance with the reproducing sequence defined by the program file, wherein reproduction, by said reproduction section, of trial content information is carried out automatically in accordance with the reproducing sequence; and
- a transmission section that transmits, to said server apparatus, a purchase request for regular, to-be-purchased contents information corresponding to the trial contents information received via said communication network, whereby a user of said client terminal apparatus is billed in accordance with the purchase request.

55. A computer program containing a group of instructions to cause a processor of a server apparatus to implement a procedure for transmitting information to a client terminal apparatus via a communication network, said server apparatus comprising: a first storage section that stores a program list file for prompting said client terminal apparatus to select a desired program file from among a plurality of program files; and a second storage section that stores a program file defining a reproducing sequence of a plurality of items of contents information including different types of contents, said procedure comprising the steps of:
- supplying said client terminal apparatus with the program list file stored in said first storage section;
- receiving a result of program file selection by said client terminal apparatus based on the program list file supplied by said first supply section; and
- on the basis of the result of the program file selection by said client terminal apparatus, supplying said client terminal apparatus with the program file stored in said second storage section, to thereby allow said client terminal apparatus to successively reproduce the plurality of items of contents information in accordance with the reproducing sequence defined by the supplied program file, wherein said client terminal apparatus automatically reproduces contents information in accordance with the reproducing sequence.

56. A computer program as claimed in claim 55, wherein said server apparatus further comprises a third storage section storing a plurality of contents information, and wherein said procedure further comprises the steps of:
- receiving a given search condition from said client terminal apparatus;
- making a search through said third storage section to retrieve one or more items of the contents information satisfying the given search condition;
- creating a program file defining a reproducing sequence of a plurality of items of contents information including the retrieved contents information; and
- supplying the created program file to said client terminal apparatus,
- whereby the plurality of items of contents information are supplied via the communication network to said client terminal apparatus for reproduction in the reproducing sequence defined by the created program file.

57. A computer program containing a group of instructions to cause a processor of a client terminal apparatus to implement a procedure for receiving contents information from a server apparatus via a communication network, said procedure comprising the steps of:
- receiving, from said server apparatus connected to the communication network, a program list file for prompting said client terminal apparatus to select a desired program file from among a plurality of program files;
- selecting a desired program file on the basis of the received program list file;
- transmitting, to said server apparatus, a result of program file selection by said step of selecting;
- receiving, from said server apparatus, the desired program file that corresponds to said result of program file selection and defines a reproducing sequence of a plurality of items of contents information including different types of contents;
- receiving, via the communication network, the plurality of items of contents information in accordance with the desired program file received from said server apparatus; and
- successively reproducing each of the received plurality of items of contents information in accordance with the reproducing sequence defined by the program file, using any one of the reproduction engines that corresponds to the type of an item of contents information to be reproduced, wherein the reproduction of said plurality of contents information are carried out automatically in accordance with the reproducing sequence.

58. A computer program as claimed in claim 57, wherein said procedure further comprises the steps of:
- specifying a given search condition to the server apparatus connected to the communication network;
- receiving, from said server apparatus, a program file defining a reproducing sequence of a plurality of items of contents information satisfying the specified search condition; and
- receiving, via the communication network, the contents information defined by the program file received from said server apparatus.

59. A computer program containing a group of instructions to cause a processor of a client terminal apparatus to implement a procedure for receiving contents information from a server apparatus via a communication network, said procedure comprising the steps of:
- receiving, from a server apparatus on the communication network, a program file defining a reproducing sequence of a plurality of items of contents information;
- on the basis of the received program file, receiving, via the communication network, the contents information defined by the received program file;
- successively reproducing the contents information, received via the communication network, in accordance with the reproducing sequence defined by the received program file, wherein the received contents information are automatically reproduced in accordance with the reproducing sequence; and
- fast-forwarding a reproduced position of the contents information in accordance with an instruction by a user.

60. A computer program containing a group of instructions to cause a processor of a client terminal apparatus to implement a procedure for receiving contents information from a server apparatus via a communication network, said procedure comprising the steps of:

receiving, from a server apparatus on the communication network, a program file defining a reproducing sequence of a plurality of items of contents information;

on the basis of the received program file, receiving, via the communication network, the contents information defined by the received program file;

successively reproducing the contents information, received via the communication network, in accordance with the reproducing sequence defined by the received program file, wherein the received contents information are automatically reproduced in accordance with the reproducing sequence; and fast-rewinding a reproduced position of the contents information in accordance with an instruction by a user.

61. A computer program containing a group of instructions to cause a processor of a server apparatus to implement a procedure for transmitting information to a client terminal apparatus via a communication network, said server apparatus comprising a storage section that stores a program file defining a reproducing sequence of a plurality of items of contents information and including contents-related information pertaining to individual ones of the plurality of items of contents information and intended for display on a display section of said client terminal apparatus, said procedure comprising the steps of:

supplying the program file, stored in said storage section, to said client terminal apparatus, whereby the plurality of items of contents information defined by the program file are supplied via the communication network to said client terminal apparatus and the contents-related information included in the program file is displayed on the display section of said client terminal apparatus, wherein said client terminal apparatus successively reproduces individual ones of the supplied contents information in accordance with the reproducing sequence, and wherein reproduction by said client terminal apparatus of the supplied contents information is carried out automatically in accordance with the reproducing sequence.

62. A computer program containing a group of instructions to cause a processor of a client terminal apparatus to implement a procedure for receiving contents information from a server apparatus via a communication network, said procedure comprising the steps of:

receiving, from the server apparatus connected to the communication network, a program file defining a reproducing sequence of a plurality of items of contents information and including contents-related information pertaining to individual ones of the items of contents information;

receiving, via said communication network, the contents information defined by the program file received from the server apparatus;

displaying a display based on the contents-related information received from the server apparatus; and successively reproducing individual ones of the received contents information in accordance with the reproducing sequence defined by the program file, wherein the received contents information are automatically reproduced in accordance with the reproducing sequence.

63. A computer program containing a group of instructions to cause a processor of a server apparatus to implement a procedure for transmitting information to a client terminal apparatus via a communication network, said server apparatus comprising: a first storage section that stores a program file defining a reproducing sequence of a plurality of items of trial contents information; and a second storage section that stores the plurality of items of trial contents information, said procedure comprising the steps of:

supplying the program file, stored in said first storage section, to said client terminal apparatus;

on the basis of the program file supplied to said client terminal apparatus, supplying the trial contents information, stored in said second storage section, to said client terminal apparatus;

receiving, from said client terminal apparatus, a purchase request for regular, to-be-purchased contents information corresponding to the trial contents information; and billing a user of said client terminal apparatus in accordance with the purchase request received from said client terminal apparatus, wherein said client terminal apparatus successively reproduces individual ones of the supplied trial contents information in accordance with the reproducing sequence, and wherein reproduction, by said client terminal apparatus, or trial content information is carried out automatically in accordance with the reproducing sequence.

64. A computer program containing a group of instructions to cause a processor of a client terminal apparatus to implement a procedure for receiving contents information from a server apparatus via a communication network, said procedure comprising the steps of:

receiving, from said server apparatus, a program file defining a reproducing sequence of a plurality of items of trial contents information;

on the basis of the program file received from said server apparatus, receiving, via said communication network, the trial contents information defined by the received program file;

successively reproducing individual ones of the received trial contents information in accordance with the reproducing sequence defined by the program file, wherein the received trial contents information are automatically reproduced in accordance with the reproducing sequence;

transmitting, to said server apparatus, a purchase request for regular, to-be-purchased contents information corresponding to the trial contents information received via said communication network, whereby a user of said client terminal apparatus is billed in accordance with the purchase request.

* * * * *